United States Patent
Petersen et al.

(10) Patent No.: US 9,432,868 B2
(45) Date of Patent: *Aug. 30, 2016

(54) METHODS AND APPARATUS TO COLLECT WIRELESS INFORMATION

(71) Applicant: The Nielsen Company (US), LLC, Schaumburg, IL (US)

(72) Inventors: David Petersen, San Francisco, CA (US); Padraig Stapleton, Pleasanton, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/681,881

(22) Filed: Apr. 8, 2015

(65) Prior Publication Data

US 2015/0223091 A1 Aug. 6, 2015

Related U.S. Application Data

(63) Continuation of application No. 14/026,777, filed on Sep. 13, 2013, now Pat. No. 9,008,586, which is a continuation of application No. 13/218,109, filed on Aug. 25, 2011, now Pat. No. 8,538,343, which is a continuation of application No. 11/809,464, filed on May 31, 2007, now Pat. No. 8,014,726.

(51) Int. Cl.
*H04B 17/00* (2015.01)
*H04W 24/08* (2009.01)
(Continued)

(52) U.S. Cl.
CPC ......... *H04W 24/08* (2013.01); *G06Q 30/0201* (2013.01); *H04M 15/00* (2013.01); *H04M 15/28* (2013.01); *H04W 4/24* (2013.01); *H04W 4/26* (2013.01)

(58) Field of Classification Search
CPC  G06Q 30/0201; H04M 15/00; H04M 15/28; H04W 4/24; H04W 4/26
USPC .............. 455/67.11, 445, 423, 566, 405, 418
See application file for complete search history.

(56) References Cited

U.S. PATENT DOCUMENTS

| 4,099,591 | A | 7/1978 | Carr |
| 4,973,952 | A | 11/1990 | Malec et al. |

(Continued)

FOREIGN PATENT DOCUMENTS

| JP | 11259422 | 9/1999 |
| WO | 02073885 | 9/2002 |

(Continued)

OTHER PUBLICATIONS

Batelle Transportation Division, "Lexington Area Travel Data Collection Test, Global Positioning Systems for Personal Travel Surveys," Sep. 15, 1997, 92 pages.

(Continued)

*Primary Examiner* — Marceau Milord
(74) *Attorney, Agent, or Firm* — Hanley, Flight & Zimmerman, LLC

(57) ABSTRACT

Example methods and apparatus to collect information on a wireless device are disclosed. A disclosed example method involves executing collecting information instructions in a firmware layer of a wireless device and outside of an operating system context to store collected information about the usage of the wireless device and to send the collected information to a data center separate from the wireless device. The collected information indicates when a media access occured on the wireless device.

19 Claims, 5 Drawing Sheets

(51) Int. Cl.
*H04M 15/00* (2006.01)
*H04M 15/28* (2006.01)
*H04W 4/24* (2009.01)
*H04W 4/26* (2009.01)
*G06Q 30/02* (2012.01)

(56) References Cited

U.S. PATENT DOCUMENTS

| | | |
|---|---|---|
| 4,990,892 A | 2/1991 | Guest et al. |
| 5,014,206 A | 5/1991 | Scribner et al. |
| 5,119,104 A | 6/1992 | Heller |
| 5,214,687 A | 5/1993 | Kansakoski et al. |
| 5,233,642 A | 8/1993 | Renton |
| 5,241,534 A | 8/1993 | Omuro et al. |
| 5,287,266 A | 2/1994 | Malec et al. |
| 5,319,638 A | 6/1994 | Lin |
| 5,345,392 A | 9/1994 | Mito et al. |
| 5,444,745 A | 8/1995 | Ali-Vehmas |
| 5,483,468 A | 1/1996 | Chen et al. |
| 5,497,373 A | 3/1996 | Hulen et al. |
| 5,521,907 A | 5/1996 | Ennis, Jr. et al. |
| 5,603,095 A | 2/1997 | Uola |
| 5,642,353 A | 6/1997 | Roy, III et al. |
| 5,675,510 A | 10/1997 | Coffey et al. |
| 5,692,215 A | 11/1997 | Kutzik et al. |
| 5,799,154 A | 8/1998 | Kuriyan |
| 5,859,838 A | 1/1999 | Soliman |
| 5,978,657 A | 11/1999 | Suzuki |
| 5,987,306 A | 11/1999 | Nilsen et al. |
| 5,999,908 A | 12/1999 | Abelow |
| 6,091,956 A | 7/2000 | Hollenberg |
| 6,108,637 A | 8/2000 | Blumenau |
| 6,115,680 A | 9/2000 | Coffee et al. |
| 6,353,929 B1 | 3/2002 | Houston |
| 6,397,256 B1 | 5/2002 | Chan et al. |
| 6,442,748 B1 | 8/2002 | Bowman-Amuah |
| 6,470,386 B1 | 10/2002 | Combar et al. |
| 6,477,580 B1 | 11/2002 | Bowman-Amuah |
| 6,480,497 B1 | 11/2002 | Flammer, III et al. |
| 6,516,189 B1 | 2/2003 | Frangione et al. |
| 6,526,413 B2 | 2/2003 | Schwitters et al. |
| 6,581,025 B2 | 6/2003 | Lehman |
| 6,587,835 B1 | 7/2003 | Treyz et al. |
| 6,606,605 B1 | 8/2003 | Kolls |
| 6,628,965 B1* | 9/2003 | LaRosa ............... H04L 12/24 455/418 |
| 6,647,269 B2 | 11/2003 | Hendrey et al. |
| 6,697,944 B1 | 2/2004 | Jones et al. |
| 6,714,536 B1* | 3/2004 | Dowling ............. H04M 7/0057 370/356 |
| 6,745,011 B1 | 6/2004 | Hendrickson et al. |
| 6,754,470 B2 | 6/2004 | Hendrickson et al. |
| 6,757,543 B2 | 6/2004 | Moran et al. |
| 6,763,458 B1 | 7/2004 | Watanabe et al. |
| 6,807,515 B2 | 10/2004 | Vogel et al. |
| 6,816,886 B2 | 11/2004 | Elvanoglu et al. |
| 6,834,308 B1 | 12/2004 | Ikezoye et al. |
| 6,837,436 B2 | 1/2005 | Swartz et al. |
| 6,840,861 B2 | 1/2005 | Jordan et al. |
| 6,883,168 B1 | 4/2005 | James et al. |
| 6,912,507 B1 | 6/2005 | Phillips et al. |
| 6,920,550 B2 | 7/2005 | Des Ii |
| 6,928,280 B1 | 8/2005 | Xanthos et al. |
| 6,968,178 B2 | 11/2005 | Pradhan et al. |
| 6,973,491 B1 | 12/2005 | Staveley et al. |
| 7,010,107 B1 | 3/2006 | Lee et al. |
| 7,013,136 B2 | 3/2006 | Frangione et al. |
| 7,072,640 B2 | 7/2006 | Bernhart |
| 7,093,243 B2 | 8/2006 | Bailey et al. |
| 7,127,261 B2 | 10/2006 | Van Erlach |
| 7,149,549 B1 | 12/2006 | Ortiz et al. |
| 7,155,210 B2 | 12/2006 | Benson |
| 7,171,157 B2 | 1/2007 | Lee |
| 7,181,519 B2 | 2/2007 | Pillai et al. |
| 7,194,758 B1 | 3/2007 | Waki et al. |
| 7,206,647 B2 | 4/2007 | Kumar |
| 7,209,473 B1 | 4/2007 | Mohaban et al. |
| 7,227,498 B2 | 6/2007 | Soliman |
| 7,319,847 B2 | 1/2008 | Xanthos et al. |
| 7,356,590 B2 | 4/2008 | Wilson et al. |
| 7,426,717 B1 | 9/2008 | Schang et al. |
| 7,434,166 B2* | 10/2008 | Acharya ............ H04L 63/0428 715/740 |
| 7,441,246 B2 | 10/2008 | Auerbach et al. |
| 7,474,645 B2 | 1/2009 | Lundin |
| 7,478,099 B1 | 1/2009 | Gandhi et al. |
| 7,479,899 B2 | 1/2009 | Horstemeyer |
| 7,504,966 B2 | 3/2009 | Horstemeyer |
| 7,523,191 B1 | 4/2009 | Thomas et al. |
| 7,548,915 B2 | 6/2009 | Ramer et al. |
| 7,551,922 B2* | 6/2009 | Roskowski et al. ......... 455/423 |
| 7,555,571 B1 | 6/2009 | Skinner |
| 7,561,069 B2 | 7/2009 | Horstemeyer |
| 7,609,650 B2 | 10/2009 | Roskowski et al. |
| 7,623,823 B2 | 11/2009 | Zito et al. |
| 7,627,872 B2 | 12/2009 | Hebeler et al. |
| 7,680,802 B2 | 3/2010 | Kato |
| 7,689,521 B2 | 3/2010 | Nodelman et al. |
| 7,693,817 B2 | 4/2010 | Dumais et al. |
| 7,697,492 B2* | 4/2010 | Petite .................... G01V 1/364 340/870.02 |
| 7,733,799 B2 | 6/2010 | Kalliola et al. |
| 7,742,762 B1 | 6/2010 | Biere et al. |
| 7,751,385 B2 | 7/2010 | Monk et al. |
| 7,756,829 B2 | 7/2010 | Bhanote |
| 7,861,225 B2 | 12/2010 | Lee |
| 7,899,915 B2* | 3/2011 | Reisman ..................... 709/228 |
| 7,949,677 B2 | 5/2011 | Croft et al. |
| 7,954,150 B2 | 5/2011 | Croft et al. |
| 8,010,679 B2 | 8/2011 | Low et al. |
| 8,014,726 B1* | 9/2011 | Petersen et al. ........... 455/67.11 |
| 8,051,180 B2 | 11/2011 | Mazzaferri et al. |
| 8,073,565 B2 | 12/2011 | Johnson |
| 8,161,172 B2 | 4/2012 | Reisman |
| 8,185,351 B2 | 5/2012 | Crystal et al. |
| 8,201,191 B2* | 6/2012 | Ladd ....................... H04L 63/10 719/328 |
| 8,260,252 B2 | 9/2012 | Agarwal |
| 8,363,650 B2* | 1/2013 | Rao et al. ..................... 370/389 |
| 8,489,669 B2 | 7/2013 | Johnson |
| 8,538,343 B2* | 9/2013 | Petersen et al. ........... 455/67.11 |
| 8,549,133 B2 | 10/2013 | Vaver |
| 9,008,586 B2* | 4/2015 | Petersen et al. ........... 455/67.11 |
| 2001/0028301 A1 | 10/2001 | Geiger et al. |
| 2001/0047291 A1 | 11/2001 | Garahi et al. |
| 2002/0002504 A1 | 1/2002 | Engel et al. |
| 2002/0025795 A1 | 2/2002 | Sharon et al. |
| 2002/0046090 A1 | 4/2002 | Stewart |
| 2002/0069037 A1 | 6/2002 | Hendrickson et al. |
| 2002/0112048 A1 | 8/2002 | Gruyer et al. |
| 2002/0160758 A1 | 10/2002 | Pradhan et al. |
| 2003/0054757 A1 | 3/2003 | Kolessar et al. |
| 2003/0115586 A1 | 6/2003 | Lejouan et al. |
| 2003/0149743 A1 | 8/2003 | Baluja et al. |
| 2003/0177488 A1 | 9/2003 | Smith et al. |
| 2004/0260470 A1 | 12/2004 | Rast |
| 2005/0136903 A1 | 6/2005 | Kashima et al. |
| 2005/0144632 A1 | 6/2005 | Mears et al. |
| 2005/0155019 A1 | 7/2005 | Levine et al. |
| 2005/0216509 A1 | 9/2005 | Kolessar et al. |
| 2005/0216844 A1 | 9/2005 | Error et al. |
| 2006/0004627 A1 | 1/2006 | Baluja |
| 2006/0019723 A1 | 1/2006 | Vorenkamp et al. |
| 2006/0090084 A1* | 4/2006 | Buer ....................... G06F 21/53 713/189 |
| 2006/0129972 A1 | 6/2006 | Tyburski et al. |
| 2006/0218533 A1 | 9/2006 | Koduru et al. |
| 2006/0270401 A1 | 11/2006 | Frangione et al. |
| 2006/0294225 A1 | 12/2006 | Grecco et al. |
| 2007/0011040 A1 | 1/2007 | Wright et al. |
| 2007/0038516 A1 | 2/2007 | Apple et al. |
| 2007/0128899 A1* | 6/2007 | Mayer ................... G06F 9/4406 439/152 |
| 2007/0150599 A1 | 6/2007 | Neogi et al. |

(56) References Cited

U.S. PATENT DOCUMENTS

| | | |
|---|---|---|
| 2007/0260475 A1 | 11/2007 | Bhanote |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0002677 A1 | 1/2008 | Bugenhagen et al. |
| 2008/0076506 A1 | 3/2008 | Nguyen et al. |
| 2008/0109295 A1 | 5/2008 | McConochie et al. |
| 2008/0126420 A1 | 5/2008 | Wright et al. |
| 2008/0140479 A1 | 6/2008 | Mello et al. |
| 2010/0030785 A1 | 2/2010 | Wilson et al. |
| 2010/0205301 A1 | 8/2010 | Ansari et al. |
| 2014/0019203 A1 | 1/2014 | Petersen et al. |

FOREIGN PATENT DOCUMENTS

| | | |
|---|---|---|
| WO | 02098029 | 12/2002 |
| WO | 2006098414 | 9/2006 |

OTHER PUBLICATIONS

Jain et al., "Congestion Avoidance in Computer Networks With a Connectionless Network Layer," Digital Equipment Corporation, Copyright 1988, Jun. 1, 1997, 21 pages.

Balakrishnan et al., "A Comparison of Mechanisms for Improving TCP Performance over Wireless Links," Aug. 1996, 14 pages.

Vucetic et al., "Network Management Applications for Wireless Local Loop," May 1998, 5 pages.

Ko, Y.F., "Automatic Call Generation and Analysis-Network Testing and Cellular Survey Tools," Oct. 1996, 1 page.

Patent Cooperation Treaty, "International Search Report," issued by the International Searching Authority in connection with PCT application No. PCT/US2007/080235, on Aug. 25, 2008, 4 pages.

Patent Cooperation Treaty, "Written Opinion of the International Searching Authority," issued by the International Searching Authority in connection with PCT application No. PCT/US2007/080235, on Aug. 25, 2008, 6 pages.

Patent Cooperation Treaty, "Written Opinion of the International Searching Authority," issued by the International Searching Authority in connection with PCT application No. PCT/US2008/056282, on Aug. 21, 2008, 5 pages.

International Bureau, "International Preliminary Report on Patentability," in connection with PCT application No. PCT/US2007/080235, on Apr. 16, 2009, 8 pages.

Patent Cooperation Treaty, "International Search Report," issued by the International Searching Authority in connection with PCT application No. PCT/US2008/056282, on Aug. 21, 2008, (5 pages).

United States Patent and Trademark Office, "Non-Final Office Action," issued in connection with U.S. Appl. No. 13/218,109, on Nov. 10, 2011, 10 pages.

United States Patent and Trademark Office, "Final Office Action," issued in connection with U.S. Appl. No. 13/218,109, on May 22, 2012, 9 pages.

United States Patent and Trademark Office, "Non-Final Office Action," issued in connection with U.S. Appl. No. 13/218,109, on Dec. 6, 2012, 10 pages.

United States Patent and Trademark Office, "Notice of Allowance," issued in connection with U.S. Appl. No. 13/218,109, on May 22, 2013, 8 pages.

United States Patent and Trademark Office, "Non-Final Office Action," issued in connection with U.S. Appl. No. 11/809,464, on Jul. 30, 2010, 17 pages.

United States Patent and Trademark Office, "Notice of Allowance," issued in connection with U.S. Appl. No. 11/809,464, on May 3, 2011, 12 pages.

United States Patent and Trademark Office, "Non-Final Office Action," issued in connection with U.S. Appl. No. 14/026,777, on Dec. 30, 2013, 14 pages.

United States Patent and Trademark Office, "Non-Final Office Action," issued in connection with U.S. Appl. No. 14/026,777, on Jun. 2, 2014, 15 pages.

United States Patent and Trademark Office, "Notice of Allowance," issued in connection with U.S. Appl. No. 14/026,777, on Dec. 3, 2014, 8 pages.

\* cited by examiner

METHODS AND APPARATUS TO COLLECT WIRELESS INFORMATION

RELATED APPLICATIONS

This patent arises from a continuation of U.S. patent application Ser. No. 14/026,777, filed on Sep. 13, 2013, which is a continuation of U.S. patent application Ser. No. 13/218,109, filed on Aug. 25, 2011, now U.S. Pat. No. 8,538,343, which is a continuation of U.S. patent application Ser. No. 11/809,464, filed on May 31, 2007, now U.S. Pat. No. 8,014,726, which claims the benefit of U.S. provisional patent application No. 60/849,054, filed on Oct. 2, 2006, all of which are hereby incorporated by reference in their entireties. In addition, this application incorporates by reference in its entirety U.S. Pat. No. 6,745,011 B1, filed on Sep. 1, 2000, by Hendrickson et al., and entitled "System and Method for Measuring Wireless Device and Network Usage and Performance Metrics."

TECHNICAL FIELD

This application relates to the field of wireless communication systems, and more particularly to methods, apparatus, and articles of manufacture to collect wireless information.

BACKGROUND ART

Growing use of wireless devices has increased the need to measure and collect information in order to improve performance and service provided to a user. For example, measuring network information (e.g., blocked calls, voice quality, dropped calls and network coverage) as well as device information (e.g., performance of a wireless device) enables the manufacturer of a wireless device as well as a network provider to improve the quality of their product by remedying the shortcomings of their product and their services.

Moreover, collecting wireless device usage information allows providers to tailor their product and services based on a usage by a given user. For example, collecting information such as the number of minutes a wireless device is used enables the provider to offer a more comprehensive plan for a given user, based on the user's particular need.

Conventionally, data gathering software that collects information is installed on a mobile station modem, microbrowser applications or on the operating system. Unfortunately, the conventional method fails to provide a non-intrusive method for collecting wireless information. For example, since data gathering software is installed as a user application or as a pre-loaded application (e.g., on the modem, on the microbrowser application or on the operating system), it causes a slowdown in the wireless device. The slowdown occurs because of additional communication and more stringent constraint to comply with lower layer components (e.g., operating system, firmware, etc.).

Moreover, data gathering software installed as a user application, is larger in size in comparison to software installed on components at a layer closer to the hardware component. In general software installed as a user application or pre-loaded application is larger in size because it contains extraneous components to allow the software to be compatible with other software/hardware components (e.g., operating system, hardware component, firmware) residing at a lower layer closer to the hardware component layer. Accordingly, installing the data gathering software on a wireless device further limits the amount of available memory in a wireless device despite its limited memory space due to physical constraints of a wireless device.

Furthermore, software installed/downloaded by a user or pre-loaded by the manufacturer is prone to errors because the software is typically not tested thoroughly with various components at each stage of manufacturing process (e.g., the chip, the operating system, and firmware). Additionally, when a user installs software or when software is pre-loaded, it can usually be accessed by a third party. Therefore, the information measured and collected by the software is usually not secure. As such, private information about a user may be intercepted and pirated by a third party, creating concerns about identity theft and abuse.

SUMMARY

Accordingly, a need has arisen to collect wireless information (e.g., network information, device information and usage information) while minimizing a slowdown in a wireless device. Moreover, a need has arisen to collect wireless information with minimal impact on the memory and resources of the wireless device. Furthermore, a need has arisen to collect wireless information with minimal number of errors. In other word, the data collector component should be tested thoroughly with various components of the wireless device at each stage of the manufacturing process. Additionally, a need has arisen to collect wireless information securely by minimizing the risk of exposing private information to a non-authorized party. As such, a need has arisen to collect wireless information securely, transparently, non-intrusively and seemlessly without impacting a user or the wireless device. It will become apparent to those skilled in the art after reading the detailed description of the present invention that the embodiments of the present invention satisfy the above mentioned needs.

In one embodiment, a wireless device comprises a processor, a transceiver, a memory and a data collecting component. According to one embodiment, the data collecting component is operable to monitor the wireless device and collect information. According to one embodiment, the collected information includes wireless network information, wireless device information and wireless device usage information. For example, the collected information may include the number of minutes the wireless device has been in use. Other examples include the type of games and websites accessed by the user. According to one embodiment, the data collecting component is installed within and/or below the operating system layer of the wireless device. For example the data collecting component may be embedded within or on top of a firmware layer, a kernel layer or the operating system or any combination thereof. In one embodiment, the collected information may be stored. Embodiments include outputting the collected information and transmitting the collected information. In one embodiment, the collected information may be processed and then transmitted and/or displayed.

As a result of installing the data collecting component within and/or below the operating system layer, the impact on the wireless device is minimized. In general, software installed at a lower layer (e.g., closer to the hardware component) are smaller in size in comparison to software programs at higher layers (e.g., above the operating system). Therefore, installing the data collecting component within and/or below the operating system layer reduces the size of data collector component, thereby reducing the amount of memory space required, thereby frees up valuable memory space.

Moreover, since the data collecting component is installed within and/or below the operating system layer, extraneous components that otherwise would be required are no longer needed, thereby minimizing the slowdown in the system. Furthermore, installing the data collecting component within and/or below the operating system layer enables the data collecting component to be thoroughly tested multiple times and at each stage of manufacturing process, e.g., by the wireless device chip manufacturer, by the wireless device manufacturer, by the operating system provider, and by the application provider, to name a few. As a result, the final product is a homogenous and a well integrated product with fewer errors.

Furthermore, applications at lower layers (e.g., operating system, firmware layer, and kernel layer) are more secure in comparison to applications running over the operating system layer. Accordingly, installing the data collecting component within or on these lower layers yields a higher level of security and protection for collecting information. As such, access to the collected information is limited to authorized parties, which ensures privacy of the user. Accordingly, the data collecting component operates in a seemless manner rendering it non-intrusive and virtually undetectable by the user of the wireless device or a third party.

More specifically, one embodiment of the present invention pertains to a method of collecting information on a wireless device including monitoring the wireless device, wherein at least a portion of a collecting information component is installed below an application layer of the wireless device, and wherein the monitoring is operated in a non-intrusive manner such that the monitoring is substantially transparent to a user of the wireless device; collecting information on the wireless device, wherein the collecting information operates in a non-intrusive manner such that the monitoring is substantially transparent to a user of the wireless device; and outputting the collected information.

Embodiments include the above and wherein the collected information is collected. According to one embodiment, the portion of the collecting information component is installed within a layer consisting of an operating system layer, a firmware layer and a kernel layer of the wireless device, wherein the firmware layer is operable to control at least one hardware component, and wherein the kernel layer is operable to manage resources and communication between software and hardware. In one embodiment of the present invention, the portion of the collecting information component is installed within multiple layers comprising an operating system layer, a firmware layer and a kernel layer of the wireless device.

In one embodiment of the present invention the portion of the collecting information component is installed on top of a layer consisting of a firmware layer and a kernel layer of the wireless device. According to one embodiment the collected information includes wireless network information; wireless device information; and wireless device usage information. In one embodiment, the collected information is stored in a protected memory component. According to one embodiment, the collected information is transmitted. In one embodiment, the collected information is stored.

DETAILED DESCRIPTION

Figure 1:
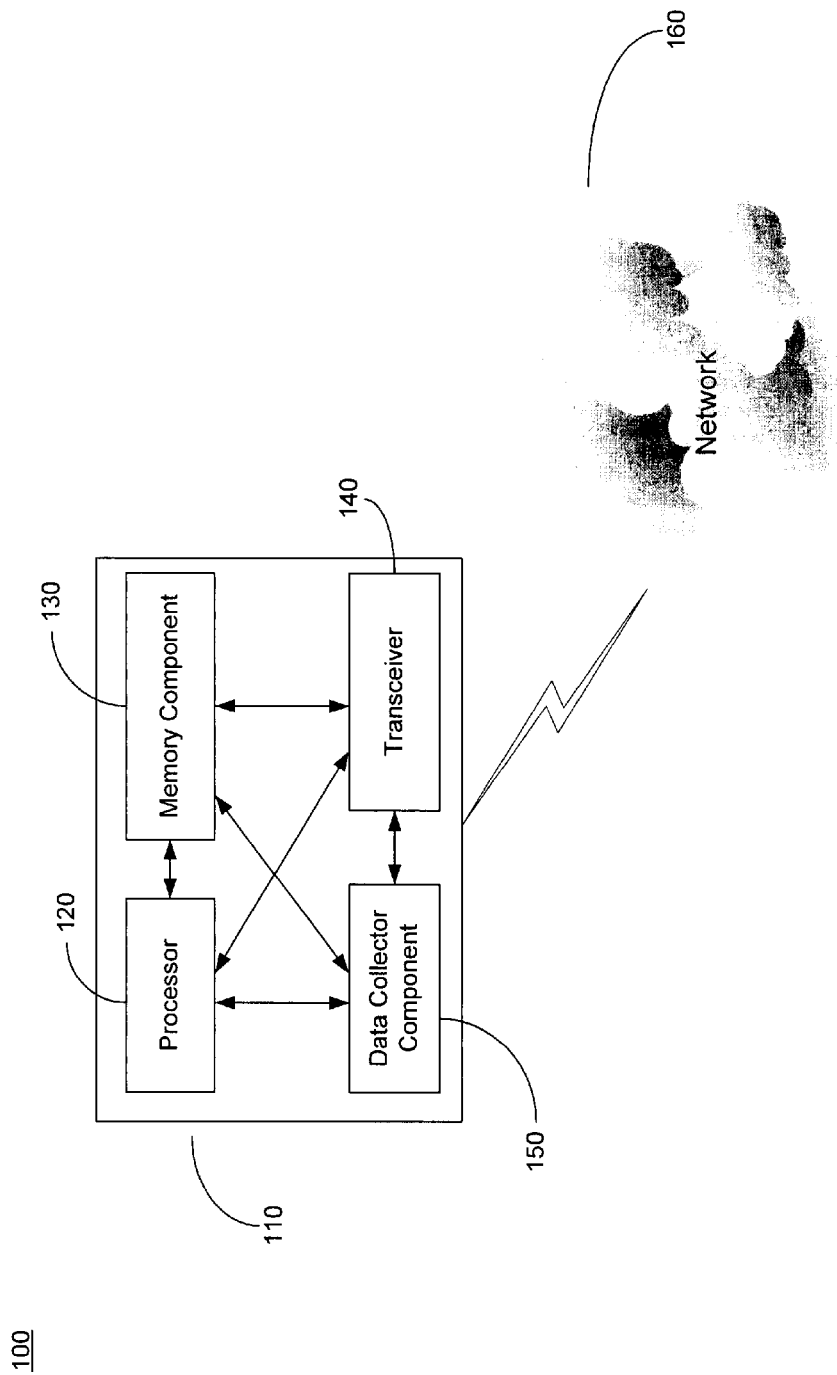
FIG. 1 shows one system embodiment for collecting information in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternative, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or "initiating" or "receiving" or "analyzing" or "generating" or "constructing" or "outputting" or "collecting" or "monitoring" or "outputting" or "storing" or "sending" or "receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A Method and System for Collecting Wireless Information Transparently and Non-Intrusively Referring now to FIG. 1, a wireless device 110 in accordance with one embodiment of the present invention is shown. In one embodiment, the wireless device 110 comprises a processor 120, at least one memory component 130, a transceiver 140 and a data collector component 150. The wireless device 110 may be a cellular phone, a personal digital assistant (PDA), a pager, a blackberry or a laptop, to name a few.

The processor 120 may be a general processor operable to execute instructions and process information. The memory component 130 is operable to store instructions and data. For example, the memory component 130 may be used to store software instructions that may be executed by the processor 120. The transceiver 140 is a transmitter/receiver component for sending and receiving data. For example, the transceiver 140 may be used to connect the wireless device to a network 160, enabling a user to make a call or access a website, to name a few.

The data collector component 150 is a component in accordance with one embodiment of the present invention that is operable to collect various data information. It is appreciated that the data collector component 150 operates in a transparent manner such that its operation is substantially non-intrusive and undetectable by the user of the wireless device and/or a non-authorize person.

The data collector component 150 is operable to monitor and collect several types of data information about the wireless device usage, the wireless device network, and the performance of the wireless device. It is appreciated that the data collector component 150 may be integrated and embedded within other components. For example, the data collector component 150 may be embedded within the memory component 130, the operating system, the kernel, the firmware or any combination thereof, to name a few.

In one embodiment, the wireless device network information comprises information regarding the number of blocked calls, the signal strength, the quality of the connection (e.g., voice quality), the amount of signal interference, roaming information, handover related issues, the number of blocked calls and the coverage provided by the network, to name a few. According to one embodiment, the information regarding the performance of the wireless device includes the battery information (e.g., charging state, voltage, last charge, lifespan, temperature), transceiver power, call setup statistics, the number of errors produced, the speed which programs or data are processed, bottleneck information and utilization of resources for various components, to name a few.

In one embodiment of the present invention, the wireless device usage information to be collected may include the amount of time the wireless device is used, the amount of time the wireless device is used for voice transmission, the time and place the wireless device is used, the destination where the wireless device places a call and the destination which the wireless device access data (e.g., server or website), to name a few. Furthermore, the wireless device usage information may include short messaging services (SMS) activity (e.g., text messaging), email activity, commerce activity and advertising activity, to name a few. Moreover, the wireless device usage information may include the amount of time the wireless device is used as mobile television, and mobile content information (e.g., the type of ring tone, the type of screen saver, the type of games, the type of wall paper, the type of shortcuts).

It is appreciated that the data collector component 150 may be a software implementation, a hardware implementation or any combination thereof. It is appreciated that various types of data information that may be collected is described and incorporated by reference in its entirety by the U.S. Pat. No. 6,745,011 81, filed on Sep. 1, 2000, by Hendrickson et al., and entitled "SYSTEM AND METHOD FOR MEASURING WIRELESS DEVICE AND NETWORK USAGE AND PERFORMANCE METRICS", which is assigned to the assignee of the instant application.

As discussed above, data gathering software installed on a mobile station modem, microbrowser or on the operating system is intrusive and detectable by the user and/or a non-authorized person. Moreover, as discussed above, when data gathering software is installed as a user application or preloaded, it may cause a slowdown in the wireless device. In general, data gathering software installed as a user application or preloaded are larger in size and as a result further limits the amount of available memory in a wireless device despite its limited memory space. Furthermore, as discussed above, data gathering software that is installed by a user or pre-loaded by the manufacturer is prone to error and generally not secure. As such, private information about a user may be intercepted and pirated by a non-authorized person, creating privacy issues and concerns about identity theft and abuse. As such, the data collector component 150 employs a method in accordance with one embodiment of the present invention to remedy the above mentioned shortcomings.

The data collector component 150 in accordance with one embodiment of the present invention is smaller in size and therefore utilizes less memory space in comparison to conventional data gathering software. Moreover, the data collector component 150 operates in a manner which is substantially transparent and invisible to the user of the wireless device. In other word, the data collector component 150 does not cause a slowdown in the system while the privacy of the user is maintained by collecting data information in a secure manner. Moreover, the data collector component 150 in accordance with one embodiment of the present invention reduces the number of errors in comparison to the conventional data gathering software due to its strenuous testing and integration at various stages of development and manufacturing of the wireless device. Accordingly, the data collector component 150 is non-intrusive and virtually undetectable by the user of the wireless device and/or non-authorized person. The method, by which the transparent, non-intrusive, transparent and invisible operation of the data collector component is achieved and discussed in conjunction with FIG. 2.

Figure 2:
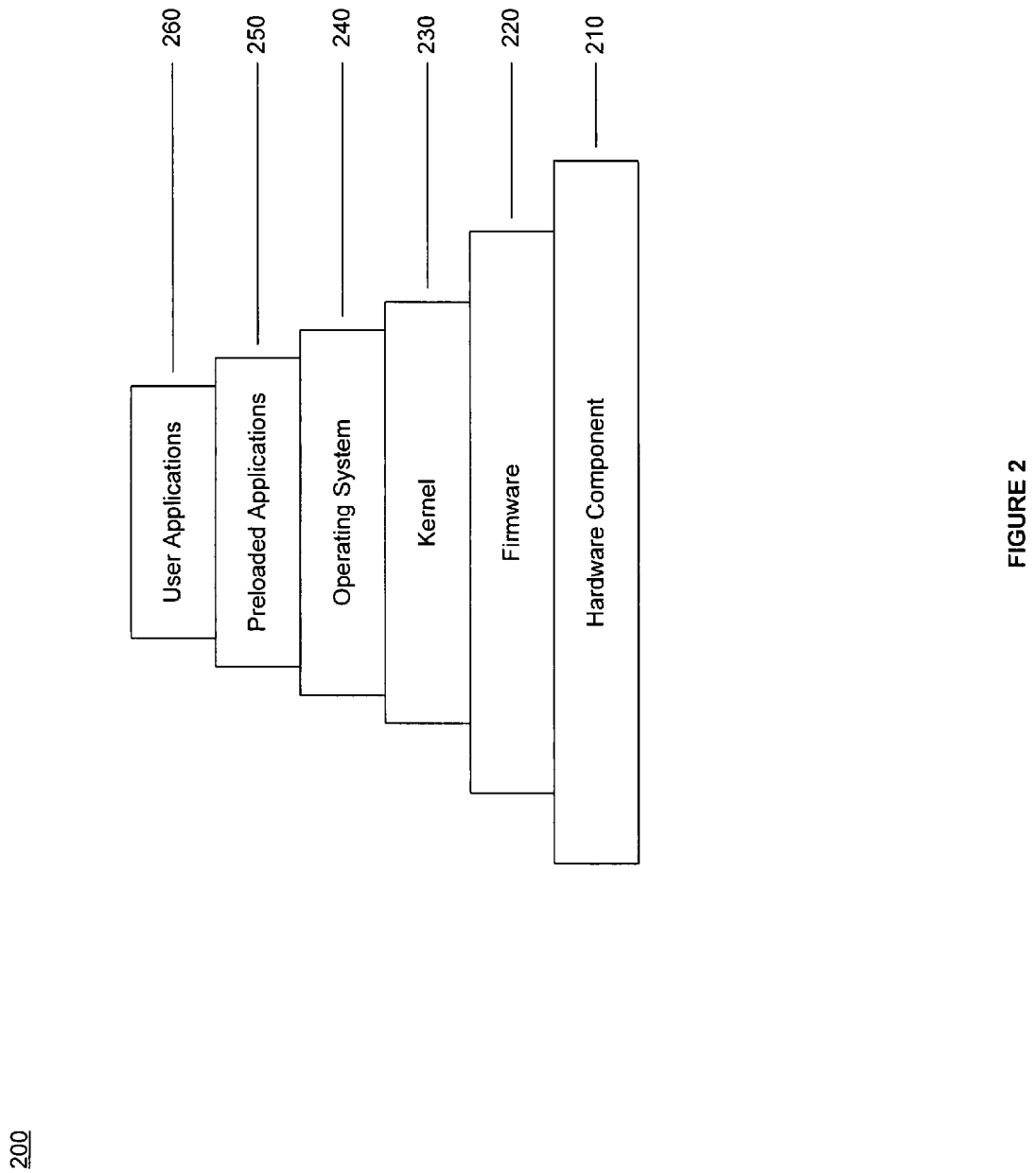
FIG. 2 shows an exemplary software layer for a data collecting component in accordance with one embodiment of the present invention.

Referring now to FIG. 2, an exemplary software layer for a data collecting component in accordance with one embodiment of the present invention is shown. The wireless device 110 comprises various layers. For example, the wireless device 110 may comprise a hardware component 210, a firmware 220, a kernel 230, an operating system 240, preloaded applications 250 and user applications 260.

The hardware component 210 may be any electronic circuitry enabling the wireless device 110 to operate. For example, the hardware component 210 may be a wireless chip enabling the wireless device 110 to communicate with the network 160. The manufactured chip may comply with various standards, e.g., code division multiple access (CDMA), global system for mobile communications (GSM), wide code division multiple access (WCDMA), time division multiple access (TOMA) and frequency time division multiple access (FDMA), to name a few.

In general the firmware 220 is used to enable the hardware component 210 to communicate with software components. In general firmware is used to control at least one hardware component. For example, the firmware 220 may be used to control the hardware component 210. In general, the firmware 220 is embedded in a hardware device (e.g., hardware component 210). Moreover, the firmware 220 may be provided on flash read only memory (ROM) or as a binary image file that can be uploaded onto the existing hardware. Similarly, the firmware 220 may be provided using other means such as an electrically erasable programmable read-only memory (EEPROM)), static read only memory (SRAM), erasable read-only memory (EPROM) or a flash memory. Firmware increases the flexibility by enabling further updates without the need to add new hardware. As a result, firmware can improve the performance, reliability and functionality of electronic devices.

In one embodiment of the present invention, the firmware 220 may be a basic input/output system (BIOS). In general, BIOS is used to prepare the device such that other software programs can load, execute, and control the device. In one embodiment, BIOS may recognize and control sub-devices that construct the wireless device 110.

The kernel 230 is an integral part of most electronic device with an operating system. The kernel 230 manages resources within the system and manages communication between the hardware 210 and software components (e.g., operating system 240, preloaded applications 250 and user applications 260, to name a few). The kernel 230 may be implemented separate from or as part of the operating system 240 where it is operable to provide lowest-level of abstraction layer for resources that applications must control in order to properly operate.

In one embodiment, the kernel 230 may be in communication and coupled to a central processing unit (CPU), a memory, hardware component 210 and software applications (e.g., user application 260). In one embodiment, the kernel 230 may be the lowest level of abstraction that is implemented in software. In general, the kernel 230 may facilitate low-level scheduling of processes, inter-process communication, process synchronization, context switch, manipulation of process control blocks, interrupt handling, process creation and destruction, process suspension and resumption, to name a few.

The kernel 230 main function is to manage resources. For example, the kernel 230 may manage CPU which executes software programs. As a result, the kernel 230 determines and allocates program to be executed by the CPU. Similarly, the kernel 230 may manage memory components that are used to store instructions and data. As a result, the kernel 230 determines and allocates the memory to be used by a given process. Moreover, the kernel 230 allocates requests from various applications to perform input/output (I/O) to various devices.

The kernel 230 may be in communication with the operating system 240. The operating system 240 may manage the hardware and software resources in the wireless device 110. For example, the operating system 240 may control and allocate memory, prioritize system requests, input/output devices, facilitate networking and manage files.

Moreover, the operating system 240 may provide a graphical user interface (GUI). In one embodiment, the operating system 240 may facilitate for higher priority processes. Accordingly, various processes may be prioritized in order to minimize the slowdown in the system. According to one embodiment, the operating system 240 provides various levels of security. For example, the operating system 240 may provide security for personal information about the user.

Moreover, in one embodiment the operating system 240 is operable to distinguish requests from an authorized and non-authorized source. The requests received may be divided into two categories, internal security and external security. The internal security may be used for programs that are being executed with an identity that may be used to check requests for resources. In contrast, external security is used for requests outside of the wireless device 110. In order to establish the identity for external security an authentication process may be used. For example, username and password may be utilized. Other method for authenticating an outside request is to use magnetic cards and biometric data, to name a few.

Preloaded applications 250 are applications that are installed on the operating system 240 of a given wireless device 110. For example, preloaded applications 250 may include various games on a cellular phone. User applications 260 are downloaded/installed applications by the user. For example, a user may download/install a new Texas Holdem game on the wireless device 110.

In general, software (e.g., preloaded applications 250 and user applications 260) programs installed on a higher layer component (e.g., on top of the operating system 240) cause a slowdown in the system since a higher layer component necessitate communications and compatibility with various lower layer components. For example, the user applications 260 are in communication with the operating system 240, the kernel 230, the firmware 220 and the hardware component 210. Accordingly, user applications 260 require more resources in order to execute properly and as a result cause a slowdown in the wireless device 110 system. Similarly, preloaded applications 250 require more resources in order to execute properly and cause a slowdown in the wireless device 110 as well.

Furthermore, in order for preloaded applications 250 and user applications 260 to execute properly, they should comply with the requirements of lower layer components (e.g., the operating system 240, the kernel 230, the firmware 220 and the hardware component 210, to name a few). As such, preloaded applications 250 and user applications 260 are larger in size and therefore occupy larger memory space since they need additional software components in order to comply with most of the lower layer components. In general, wireless devices have small memory components due to physical constraints of the wireless device. Therefore, preloaded applications 250 and user applications 260 further reduce the amount of valuable free memory space.

Furthermore, software programs installed on higher layer components are not tested during various stages of manufacturing. For example, user applications 260 are tested after the hardware component 210, the firmware 220, the kernel 230 and the operating system 240 are integrated within the wireless device 110. Accordingly, user applications 260 are not thoroughly tested at each stage of manufacturing the wireless device 110 (e.g., when the hardware component 210 is installed, when the firmware 220 is installed, and etc.). Similarly, preloaded applications 250 are not thoroughly tested. As such, software programs installed on higher layer components (e.g., above the operating system 240) are more prone to error in comparison to lower layer components.

Moreover, software programs installed on higher layer components are in general less secure than programs in the lower layer components. Therefore, software programs installed on the operating system (e.g., preloaded applications 250 and user applications 260) are in general less secure and pose a risk to user's privacy. In contrast, lower layer software components (e.g., the operating system 240) as described above may have various levels of security.

Accordingly, in order to collect wireless information (e.g., the wireless device usage, the wireless device network, and the performance of the wireless device) without causing a slowdown in the system, with minimal number of errors and without reducing valuable free memory space while protecting the user's privacy and security, at least a portion of the data collector component 150 is embedded and installed within and/or below the operating system 240 component layer. For example, at least a portion of the data collector component 150 may be embedded within the operating system 240. Similarly, at least a portion of the data collector component 150 may be embedded within the kernel 230 and/or firmware 220. In one embodiment of the present invention, at least a portion of the data collector component 150 is installed on top of the kernel 230 and/or the firmware 220.

Accordingly to one embodiment of the present invention, at least a portion of the data collector component 150 is distributed among multiple layers. For example, at least a portion of the data collector component 150 may be embedded within the operating system 240 and at least a portion of the data collector component 150 may be installed on top of the kernel 230 and/or the firmware 240. Similarly, at least a portion of the data collector component 150 may be embedded within the kernel 230, at least a portion installed on top of the firmware 220 and/or at least a portion installed on top of the operating system 240. Accordingly, the data collector component 150 may be distributed in any combination as long as at least one portion of the data collector component 150 is installed within and/or below the operating system 240.

Figure 3:
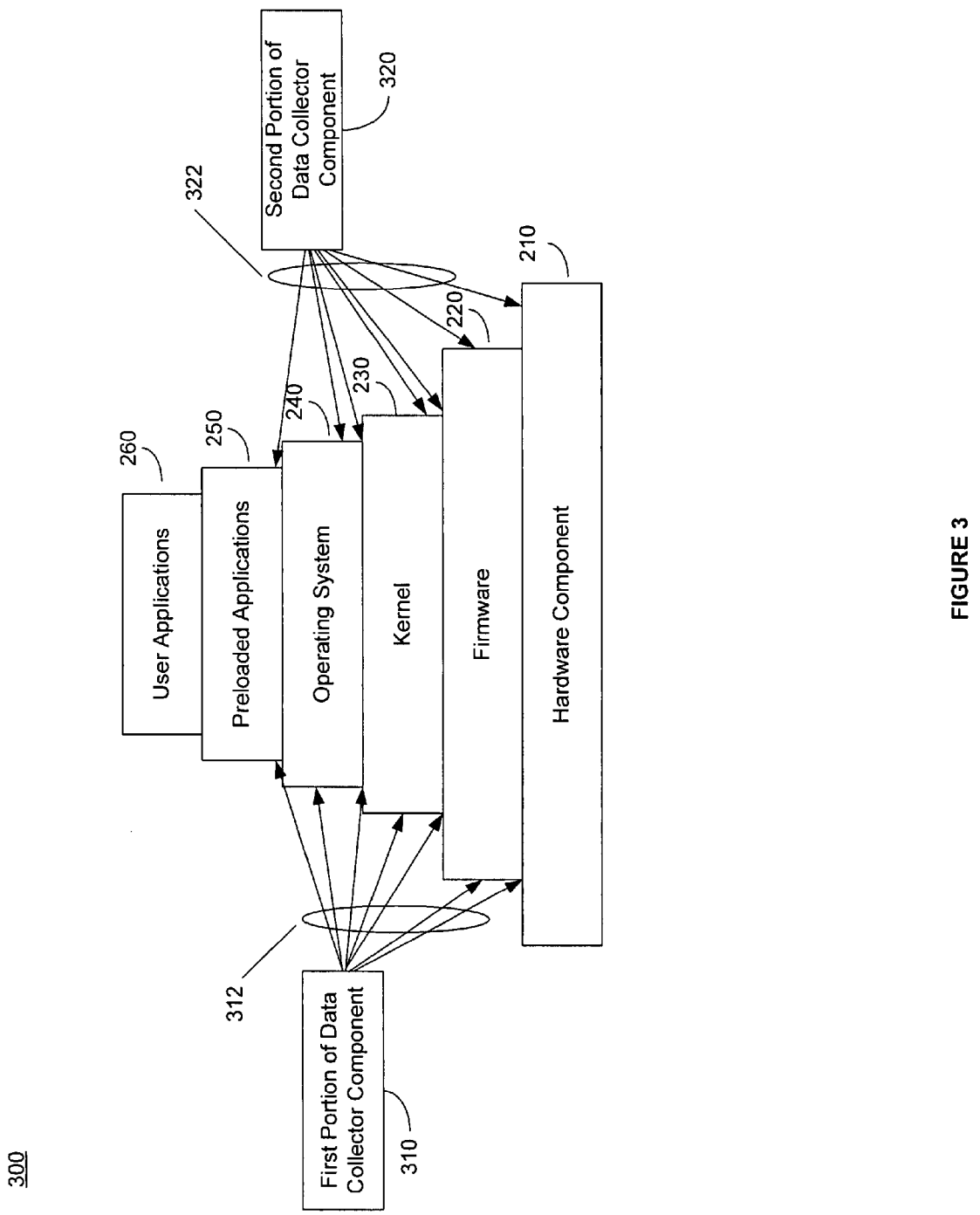
FIG. 3 shows an exemplary software layer where a data collecting component resides in accordance with one embodiment of the present invention.

Referring now to FIG. 3, one exemplary software layer where a data collecting component resides in accordance with one embodiment of the present invention is shown. The data collecting component 150 may be partitioned into various portions. For example, the data collecting component 150 may be partitioned into two portions, a first portion 310 and a second portion 320. It is appreciated that even though in this example two portions are shown, the data collecting component 150 may be partitioned into many more portions. Therefore, the two portions of data collector component shown are exemplary and not intended to limit the scope of the present invention.

As discussed above, the data collector component 150 may be distributed among multiple layers. For example, the first portion 310 may be embedded within the operating system 240, the kernel 230, the firmware 220 and/or on top of the operating system 240, the kernel 230, the firmware 220 and the hardware component 210, to name a few. Similarly, the second portion 320 may be embedded within the operating system 240, the kernel 230, the firmware 220 and/or on top of the operating system 240, the kernel 230, the firmware 220 and the hardware component 210, to name a few. It is appreciated that the first portion 310 and the second portion 320 may be embedded within and/or on top of these layers or any combination thereof as shown by possible connections, 312 and 322.

It is appreciated that even though the data collector component 150 is portioned into two portions and distributed within the operating system 240, the kernel 230, the firmware 220 and the hardware component 210 layers, the distribution of the data collector component 150 is exemplary and may be distributed and extended to any layer within or below the operating system 240 layer (e.g., layers below the preloaded applications 250). Accordingly, the two portions and the layers shown are exemplary and are not intended to limit the scope of the present invention.

As a result of inserting at least a portion of the data collector component 150 within and/or below the operating system 240, the data collector component 150 is operable to collect wireless information without causing a slowdown in the wireless device. Moreover, the data collector component 150 collects wireless information without significantly reducing valuable memory space.

Furthermore, since at least a portion of the data collector component 150 is installed within and/or below the operating system 240 layer, the data collector component 150 is tested thoroughly during each stage of manufacturing. For example, assuming that the data collector component 150 is installed within the firmware 220, the data collector component 150 is tested when the firmware 220 is installed on the hardware component 210. Moreover, the data collector component 150 is tested again once the kernel 230 is installed on the firmware 220. Furthermore, the data collector component 150 is tested once more when the operating system 240 is installed on the kernel 230. Similarly, the data collector component 150 is tested more as each additional layer of components is added. As a result, the data collector component 150 is thoroughly tested and produces fewer errors in comparison to applications running at a higher layer (e.g., user applications 260) and operates in a transparent, seemless and non-intrusive manner which is substantially undetectable by the user.

Moreover, according to one embodiment of the present invention since at least a portion of the data collector component 150 is installed within and/or below the operating system 240, the data collector component 150 is provided with an additional layer of security. As a result, collected data is secure and the privacy of the user is maintained. It is appreciated that in one embodiment, the privacy of user is further maintained by storing the collected information in a protected memory component. As a result, the data collector component 150 operates in a non-intrusive manner that is virtually undetectable by the user of the wireless device and/or non-authorize person. Therefore, the data collector component 150 operates transparently without substantially impacting the available resources (e.g., memory) and without substantially impacting the operation of the wireless device.

Figure 4:
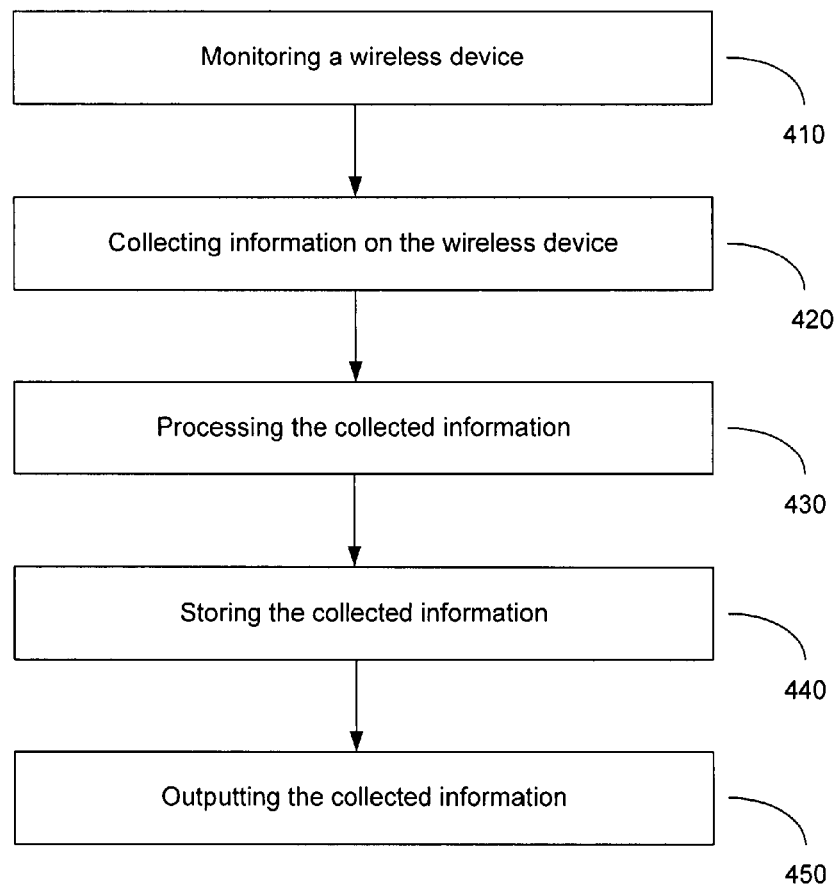
FIG. 4 shows a flow diagram for collecting information in accordance with one embodiment of the present invention.

Referring now to FIG. 4, a flow diagram for collecting information in accordance with one embodiment of the present invention is shown. At step 410, the data collector component 150 described above, wherein at least a portion of the data collector component 150 is embedded within and/or below the operating system 240, monitors the wireless device 110. For example, the data collector component 150 may monitor various activities such as data information about the wireless device usage, the wireless device network, and the performance of the wireless device, to name a few.

At step 420, the data collector component 150 collects information about the wireless device. For example, the data collector component 150 may collect information regarding the wireless device usage, the wireless device network, and the performance of the wireless device, to name a few and as discussed above.

Optionally, at step 430 the data collector component 150 may process the collected information. For example, the data collector component 150 may process the collected data for rendering on a display. In one embodiment, the processed data may be represented as a graph, as a chart (e.g., a pie chart), in tabular form, and etc., to name a few.

Optionally, at step 440 the collected information may be stored. For example, the collected information may be stored in a protected memory component, in a ROM, in a RAM, and etc., to name a few. Optionally, the processed information at step 430 may also be stored in a similar manner.

At step 450, the data collector component 150 may output the collected information. For example, the data collector component 150 may output the collected information to a memory component. Similarly, the data collector component 150 may output the collected information to a display or transmit that information to a processing center or a data depository center.

Figure 5:
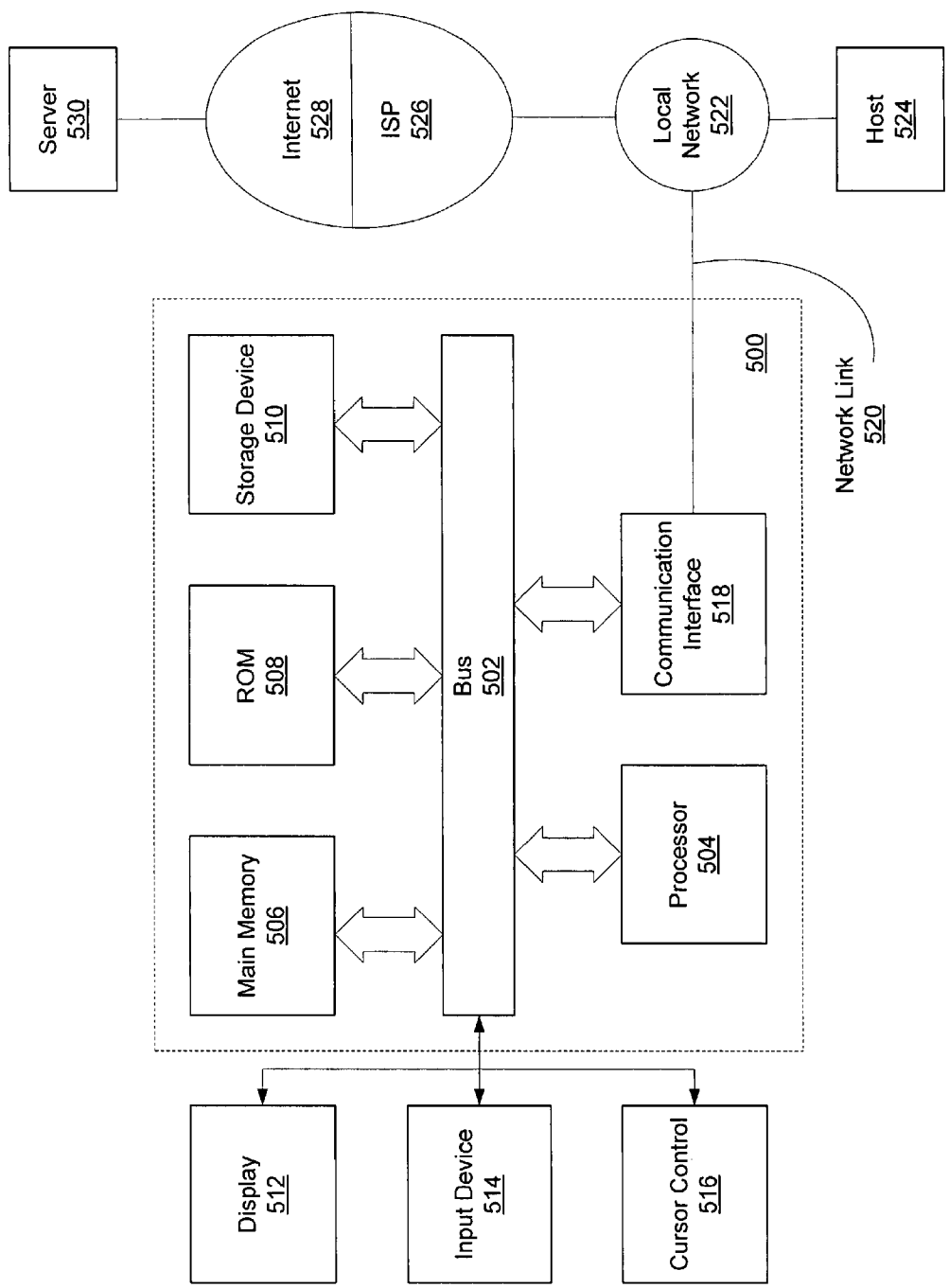
FIG. 5 illustrates a general purpose wireless device that may serve as a platform for receiving and gathering data in accordance with embodiments of the present invention.

FIG. 5 is a block diagram that illustrates a wireless device 500 upon which an embodiment of the invention may be implemented. Wireless device 500 may implement the method of collecting information on a wireless device as shown in FIGS. 1-4 and includes a bus 502 or other communication mechanism for communicating information, and a processor 504 coupled with bus 502 for processing information. Wireless device 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Wireless device 500 further includes a read only memory (ROM) 508 or other static storage device coupled to bus 502 for storing static information and instructions for processor 504. A non-volatile storage device 510, such as a magnetic disk or optical disk, is provided and coupled to bus 502 for storing information and instructions and may store the persistent internal queue.

Wireless device 500 may be coupled via bus 502 to an optional display 512, such as a cathode ray tube (CRT), for displaying information to a computer user. An optional input device 514, including alphanumeric and other keys, may be coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512.

The invention is related to the use of wireless device 500 for collecting information on a wireless device. According to one embodiment of the invention, the interface is used in response to processor 504 executing one or more sequences of one or more instructions contained in main memory 506 e.g., to implement process 400. Such instructions may be read into main memory 506 from another computer readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to wireless device 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Wireless device 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams.

The signals through the various networks and the signals on network link 520 and through communication interface 518, which carry the digital data to and from wireless device 500, are example forms of carrier waves transporting the information.

Wireless device 500 can send and receive messages through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of collecting information on a wireless device, the method comprising:
    executing collecting information instructions in a firmware layer of a wireless device and outside of an operating system context of the wireless device to:
        store collected information about usage of the wireless device, the collected information indicating when an access to advertising occurred on the wireless device; and
        send the collected information to a data center separate from the wireless device.

2. The method of claim 1, wherein the collected information further indicates at least one of when the wireless device operated for commerce activity or a duration for which the wireless device operated as a mobile television.

3. The method of claim 1, wherein the collecting information instructions are to communicate with a component installed within a kernel layer.

4. The method of claim 1, wherein the collected information further indicates a server or website at which the wireless device accessed media.

5. The method of claim 1, wherein the collected information further includes at least one of:
    an indication of a type of shortcut on the wireless device,
    an indication of a short messaging service activity, or
    an indication of signal strength.

6. The method of claim 1, wherein the collecting information instructions are to collect the collected information about a user application installed in the wireless device.

7. The method of claim 1, further including rendering the collected information on a display of the wireless device using at least one of a graph, a chart, or a table to represent an amount of time the wireless device is used for voice transmission and an amount of time the wireless device is used as a mobile television.

8. The method of claim 7, wherein the rendering of the collected information on the display of the wireless device further includes representing short messaging service usage, email usage, commerce usage, and advertising activity.

9. A wireless device comprising:
    a firmware layer including collecting information instructions; and
    a processor to execute the collecting information instructions in the firmware layer and outside of an operating system context of the wireless device, the collecting information instructions to cause the processor to at least:
        store collected information about usage of the wireless device, the collected information indicating when an access to an advertisement occurred on the wireless device; and
        send the collected information to a data center separate from the wireless device.

10. The wireless device of claim 9, wherein the collected information further indicates at least one of when the wireless device operated for commerce activity or a duration for which the wireless device operated as a mobile television.

11. The wireless device of claim 9, wherein the collecting information instructions are further to cause the processor to communicate with a component installed within a kernel layer.

12. The wireless device of claim 9, wherein the collected information further indicates a server or a website at which the wireless device accessed the media.

13. The wireless device of claim 9, wherein the collected information further includes at least one of:
    an indication of a type of shortcut on the wireless device,
    an indication of a short messaging service activity, or
    an indication of signal strength.

14. The wireless device of claim 9, wherein the collecting information instructions are to collect the collected information about a user application installed in the wireless device.

15. The wireless device of claim 9, wherein the collecting information instructions are further to cause the processor to render the collected information on a display of the wireless device using at least one of a graph, a chart, or a table to represent an amount of time the wireless device is used for voice transmission and an amount of time the wireless device is used as a mobile television.

16. The wireless device of claim 15, wherein the collecting information instructions are further to cause the processor to render the collected information on the display of the wireless device using the at least one of the graph, the chart, or the table, to represent short messaging service usage, email usage, commerce usage, and advertising activity.

17. A machine accessible storage device or storage disk comprising instructions to be executed in a firmware layer of a wireless device and outside of an operating system context of the wireless device, the instructions to cause a processor of the wireless device to at least:
    store collected information about usage of the wireless device, the collected information indicating when an access to an advertisement occurred on the wireless device; and
    send the collected information to a data center separate from the wireless device.

18. The machine accessible storage device or storage disk of claim 17, wherein the instructions are further to cause the processor to render the collected information on a display of the wireless device using at least one of a graph, a chart, or a table to represent an amount of time the wireless device is used for voice transmission and an amount of time the wireless device is used as a mobile television.

19. The machine accessible storage device or storage disk of claim 18, wherein the instructions are further to cause the processor to render the collected information on the display of the wireless device using the at least one of the graph, the chart, or the table, to represent short messaging service usage, email usage, commerce usage, and advertising activity.

\* \* \* \* \*